United States Patent [19]

Hara

[11] Patent Number: 4,980,827
[45] Date of Patent: Dec. 25, 1990

[54] SIGNAL PROCESSING METHOD FOR DETERMINING BASE SEQUENCE OF NUCLEIC ACID

[75] Inventor: Makoto Hara, Kanagawa, Japan

[73] Assignee: Fuji Photo Film Co., Ltd., Minami-ashigara, Japan

[21] Appl. No.: 917,606

[22] Filed: Oct. 10, 1986

[30] Foreign Application Priority Data

Oct. 11, 1985 [JP] Japan ................................ 60-226092

[51] Int. Cl.$^5$ .......................................... G01N 33/58
[52] U.S. Cl. ......................... 364/413.01; 364/413.15; 382/6
[58] Field of Search .................. 935/77; 435/6; 382/6; 364/413.01, 413.13, 413.15

[56] References Cited

U.S. PATENT DOCUMENTS

| | | | |
|---|---|---|---|
| 4,665,312 | 5/1987 | Shiraishi et al. | 250/303 |
| 4,734,581 | 3/1988 | Hashiue | 250/484.1 B |
| 4,777,597 | 10/1988 | Shiraishi et al. | 364/413.01 |
| 4,802,101 | 1/1989 | Hara | 364/413.01 |
| 4,837,733 | 6/1989 | Shiraishi et al. | 364/413.01 |
| 4,841,443 | 6/1989 | Kakumoto et al. | 364/413.01 |
| 4,852,050 | 1/1984 | Shiraishi et al. | 382/6 |

FOREIGN PATENT DOCUMENTS 0182366 10/1984 Japan ................................ 364/413.01

*Primary Examiner*—Jerry Smith
*Assistant Examiner*—Kimthanh T. Bui
*Attorney, Agent, or Firm*—Sixbey, Friedman, Leedom & Ferguson

[57] ABSTRACT

A signal processing method for determining base sequence of nucleic acid by subjecting digital signals to signal processing, said digital signal corresponding to an autoradiograph of resolved rows which are formed by resolving four exclusive groups of radioactively labeled base-specific fragments of the nucleic acid in one-dimensional direction on a support medium, which comprises steps of:
(i) preparing a one-dimensional waveform for each resolved row;
(ii) detecting a maximum position on the one-dimensional waveform;
(iii) making a search for whether a maximum position exists within a given region including the corresponding position to said maximum position on other one-dimensional waveforms;
(iv) when the maximum position exists on the other one-dimensional waveforms, comparing the signal level at the maximum positions with each other and determining a band to exist at the maximum position having the higher level and not at the other maximum position, or when the maximum position does not exist thereon, determining a band to exist at the maximum position detected in the step (ii);
(v) detecting again a maximum position on the one-dimensional waveform; and
(vi) repeating in order the steps (iii) and (v) to thereby determine the positions of bands on all the resolved rows.

10 Claims, 2 Drawing Sheets

SIGNAL PROCESSING METHOD FOR DETERMINING BASE SEQUENCE OF NUCLEIC ACID

BACKGROUND OF THE INVENTION

1. Field of the Invention

This invention relates to a signal processing method for determining base sequence of nucleic acid.

2. Description of the Prior Art

It is essential to obtain genetic information carried by organisms in order to make the function or replication mechanism of the organism clear in the field of molecular biology which has been rapidly developed in recent years. Particularly, it is essential to determine base sequence of nucleic acids such as DNA (or DNA fragment; the same applies hereinbelow) which carries specific genetic information.

Maxam-Gilbert method and Sanger-Coulson method are known as typical methods for determining the base sequence of nucleic acids such as DNA and RNA. In the former Maxam-Gilbert method, a group containing a radioactive isotope such as $^{32}P$ is attached to a chain molecule of DNA or a DNA fragment at one end to label it with the radioactive element and then the bond between the constitutional units of the chain molecule is base-specifically cleaved by a chemical reaction. A mixture of the resulting base-specific DNA cleavage products is resolved (developed) through gel electrophoresis to obtain a resolved pattern (not visible) wherein each of the numerous cleavage products is resolved on the gel support medium. The resolved pattern is visualized on a radiographic film such as an X-ray film to obtain an autoradiograph thereof as a visible image. The bases in certain positional relationships with the end of the radioactive element-attached chain molecule can be sequentially determined according to the visualized autoradiograph and the applied base-specific cleavage means. In this way, the sequence for all bases of the DNA specimen can be determined.

In the latter Sanger-Coulson method, synthetic DNA products which are complementary to the chain molecule of DNA or DNA fragment and radioactively labeled, are base-specifically synthesized by utilizing a chemical reaction, and the obtained mixture of numerous synthetic DNA products is resolved on a support medium by gel electrophoresis to obtain a resolved pattern. In a similar manner to that described above, the base sequence of DNA can be determined according to the visualized autoradiograph.

For the purpose of carrying out the determination of the base sequence of nucleic acids simply with high accuracy in autoradiography, there are described in U.S. patent application Ser. No. 07/378,509 and No. 07/423,686 autoradiographic procedures which utilize a radiation image recording and reproducing method using a stimulable phosphor sheet, in place of the above-mensioned conventional radiography using a radiosensitive material such as an X-ray film. The stimulable phosphor sheet comprises a stimulable phosphor and has such properties that when exposed to a radiation, the stimulable phosphor absorbs a portion of radiation energy and then emits light (stimulated emission) corresponding to the radiation energy stored therein upon excitation with an electromagnetic wave (stimulating rays) such as visible light or infrared rays. According to this method, exposure time can be greatly shortened and there is no fear of causing problems such as chemical fog associated with prior arts. Further, since the autoradiograph having information on radioactively labeled substances is stored in the phosphor sheet as radiation energy and then read out as stimulated emission in time sequence, information can be expressed by the form of numerals and/or symbols in addition to image.

The base sequence of nucleic acids has been conventionally determined by visually judging individual resolved positions of the base-specific cleavage products or the base-specific synthetic products of radioactively labeled nucleic acid (hereinafter referred on as to simply base-specific fragments of nucleic acid) on the autoradiograph and comparing them among the resolved rows thereof. Namely, the analysis of the autoradiograph is done by observing the visualized autoradiograph with eyes, and such visual analysis requires great amounts of time and labor.

Further, since the visual analysis of the autoradiograph varies or fluctuates owing to the skill of investigators, the results on the determination of the base sequence of nucleic acid vary depending on the investigators and the accuracy of information is limited to a certain extent.

In order to improve the accuracy of the information, there are proposed in U.S. patent application Ser. Nos. 4,777,597 and 07/161,248 methods for automatically determining the base sequence of DNA by obtaining the autoradiograph as digital signals and subjecting the digital signals to appropriate signal processing. The digital signals corresponding to the autoradiograph can be obtained either by visualizing the autoradiograph on a radiographic film and photoelectrically reading out the visible image on said film by means of reflected light or transmitted light when the conventional radiography is employed, or by directly reading out the stimulable phosphor sheet without the visualization of the autoradiograph when the radiation image recording and reproducing method is employed.

However, the resolved pattern obtained by resolving (developing) radioactively labeled substances on a support medium by electrophoresis or the like is liable to cause various distortion and noise. Usually, the four groups of DNA fragments or RNA fragments, each of which is composed of base-specific cleavage products or synthetic products, have been resolved simultaneously in parallel on a support medium by electrophoresis or the like. The base sequence of nucleic acid has been determined by comparing individual resolved portions (bands) among the resolved rows. When the production and the separation of the base-specific fragments are insufficient during the preparation of a sample, or when the base-specific fragments are mixed with each other during the introduction of the sample into slots, bands (ghost bands) happen to appear at positions where any band inherent to the resolved row should not exist. The bands including such ghost bands are compared with each other, and as a result, an error is caused in the determination of the base sequence to lower the accuracy of information on the base sequence.

It is highly desired that the base sequence of nucleic acids is automatically determined with high accuracy by subjecting the digital signals corresponding to the autoradiograph to signal processing, even when such noises are caused.

SUMMARY OF THE INVENTION

The present inventor has found that the base sequence of DNA and RNA can be automatically determined with easiness and high accuracy by subjecting digital signals corresponding to the autoradiograph of a resolved pattern causing noises.

The present invention provides a signal processing method for determining base sequence of DNA by subjecting digital signals to signal processing, said digital signal corresponding to an autoradiograph of four resolved rows which are formed by resolving each of the following four groups of base-specific DNA fragments labeled with a radioactive element in one-dimensional direction on a support medium,
 (1) guanine-specific DNA fragments;
 (2) adenine-specific DNA fragments;
 (3) thymine-specific DNA fragments; and
 (4) cytosine-specific DNA fragments;
which comprises steps of:
 (i) preparing a one-dimensional waveform composed of signal position along the resolving direction and signal level for each resolved row;
 (ii) detecting a position where signal level is maximum on the one-dimensional waveform of a resolved row;
 (iii) making a search for whether a position where signal level is maximum exists within a given region including the corresponding position to said maximum position on the one-dimensional waveform for each of other resolved rows;
 (iv-a) when the maximum position exists on the one-dimensional waveform for any of said other rows in the step (iii), comparing the signal level at said maximum position with the signal level at the maximum position detected in the step (ii) and making such determination that a band exists at the maximum position having the higher level and no band exists at the other maximum position;
 (iv-b) when the maximum position does not exist on the one-dimensional waveforms of said other rows in the step (iii), making such determination that a band exists at the maximum position detected in the step (ii);
 (v) detecting again a position where signal level is maximum on the one-dimensional waveform of a resolved row; and
 (vi) repeating in order the steps (iii) and (v) to thereby determine the positions of bands on all the resolved rows.

The present invention further provides a signal processing method for determining base sequence of RNA by subjecting digital signals to signal processing, said digital signal corresponding to an autoradiograph of four resolved rows which are formed by resolving each of the following four groups of base-specific RNA fragments labeled with a radioactive element in one-dimensional direction on a support medium,
 (1) guanine-specific RNA fragments;
 (2) adenine-specific RNA fragments;
 (3) uracil-specific RNA fragments; and
 (4) cytosine-specific RNA fragments;
which comprises the above-described steps (i) to (vi).

According to the present invention, the base sequence of DNA or RNA can be simply and accurately determined by processing the digital signals corresponding to the autoradiograph of the resolved pattern which is obtained by resolving a mixture of the base-specific fragments of DNA or RNA on a support medium, through an appropriate signal processing circuit having a function capable of eliminating noises, even when the resolved pattern causes noises.

For instance, in the Sanger-Coulson method using synthetic base-specific DNA fragments complementary to DNA to be base-sequenced as a sample, there is employed such exclusive combination comprising the four groups of guanine(G)-specific DNA fragments, adenine(A)-specific DNA fragments, thymine(T)-specific DNA fragments and (4) cytosine(C)-specific DNA fragments as described above. When the insufficient separation of these four groups of the sample or the false mixing thereof brings about ghost bands on a resolved pattern, there can be precisely judged whether each of appearing bands is inherent to the resolved row to which said band belongs by utilizing that two or more bands are not essentially detected at the same positions on the resolved rows because of the exclusive combination.

The intrinsic bands are detected and at the same time the positions of said bands are determined by subjecting digital signals containing information on the position of each band and the intensity of radioactivity (that is, the amount of the sample) of each band to appropriate signal processing such as comparison operational processing, and the bands are sequenced on the basis of the band positions to determine the base sequence of the nucleic acid with easiness and high accuracy.

DETAILED DESCRIPTION OF THE INVENTION

Figure 1:
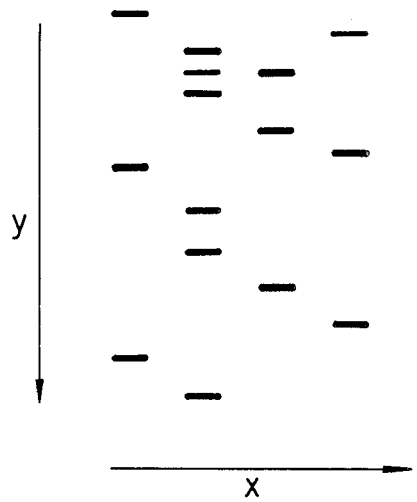
FIG. 1 shows an example of an electrophoretic pattern consisting of the first to fourth lanes.

Examples of samples employable in the present invention include mixtures of base-specific fragments of nucleic acids such as DNA and RNA labeled with a radioactive element. The term "fragments" of nucleic acids mean portions of a long-chain molecule. For instance, a mixture of base-specific DNA cleavage products, which is a kind of a mixture of base-specific DNA fragments, can be obtained by base-specifically cleaving the radioactively labeled DNA according to the aforementioned Maxam-Gilbert method. A mixture of base-specific DNA synthetic products can be obtained by synthesizing from radioactively labeled deoxynucleoside triphosphates and DNA polymerase by use of DNA as a template according to the aforementioned Sanger-Coulson method. Mixtures of base-specific RNA fragments can be also obtained as a mixture of cleavage products or a mixture of synthetic products in the similar manner to the DNA methods. DNA is composed of four kinds of bases: adenine, guanine, thymine and cytosine as its constitutional units, and RNA is composed of four kinds of bases: adenine, guanine, uracil and cytosine.

Thus obtained samples are the following combinations of four groups exclusive to each other:
 (1) guanine-specific DNA fragments;
 (2) adenine-specific DNA fragments;

(3) thymine-specific DNA fragments;
(4) cytosine-specific DNA fragments; and
(1) guanine-specific RNA fragments;
(2) adenine-specific RNA fragments;
(3) uracil-specific RNA fragments;
(4) cytosine-specific RNA fragments.

These substances are labeled with a radioactive element such as $^{32}P$, $^{14}C$, $^{35}S$, $^{3}H$ or $^{125}I$ by any of appropriate methods.

A sample, which is a mixture of the radioactively labeled base-specific fragments of a nucleic acid, is be resolved (developed) on a known support medium such as a gel support medium by any of conventional resolving (developing) procedures such as electrophoresis, thin layer chromatography, column chromatography and paper chromatography.

The support medium on which the radioactively labeled substances are resolved, is autoradiographed by means of the conventional radiography using a radiosensitive material or the radiation image recording and reproducing method using a stimulable phosphor sheet. The digital signals corresponding to the autoradiograph are then obtained through an appropriate read-out system.

When the conventional radiography is used, the support medium and a radiosensitive material such as an X-ray film are placed together in layers at a low temperature of −90° to −70° C. for a long period of time (several tens of hours) to expose the radiographic film. The radiographic film is then developed to visualize the autoradiograph of the radioactively labeled substances on the film, and the visualized autoradiograph is read out by using an image read-out system. For instance, the radiographic film is irradiated with an optical beam and the beam transmitted thereby or reflected therefrom is photoelectrically detected, whereby the visualized autoradiograph can be transformed to electric signals. Further, the electric signals are converted into digital signals corresponding to the autoradiograph through A/D conversion.

When the radiation image recording and reproducing method is used, the support medium and the stimulable phosphor sheet are placed together in layers at an ambient temperature for a short period of time (several seconds to several tens of minutes) to store radiation energy radiating from the radioactively labeled substances in the phosphor sheet, whereby the autoradiograph is recorded as a kind of a latent image (energy-stored image) on the phosphor sheet. The stimulable phosphor sheet, for instance, has a basic structure where a support comprising a plastic film, a phosphor layer comprising a stimulable phosphor such as a divalent europium activated barium fluorobromide phosphor ($BaFBr:Eu^{2+}$) and a transparent protective film are laminated in this order. The stimulable phosphor has characteristics of absorbing and storing radiation energy when irradiated with a radiation such as X-rays and subsequently releasing the stored radiation energy as stimulated emission when excited with visible light to infrared rays.

Then, the autoradiograph stored and recorded on the stimulable phosphor sheet is read out by using a read-out system. For instance, the phosphor sheet is scanned with a laser beam to release the radiation energy stored in the stimulable phosphor as light emission and the emitted light is photoelectrically detected, so that the autoradiograph can be directly obtained as electric signals without the visualization thereof. Further, the electric signals are converted into digital signals corresponding to the autoradiograph through A/D conversion.

The above-described methods for measuring the autoradiograph and obtaining the digital signals corresponding thereto are described in more detail in the aforementioned U.S. patent application Ser. Nos. 837,037 and 568,877.

While the methods for obtaining the digital signals corresponding to the autoradiograph using the conventional radiography and the radiation image recording and reproducing method are described above, the present invention is not limited thereto and digital signals obtained by any other methods can be applied to the signal processing method of the invention, provided that they correspond to the autoradiograph.

In the above read-out procedures, it is not always necessary to conduct the read-out operation of the autoradiograph all over the surface of the radiographic film or the stimulable phosphor sheet. Only the image region may be subjected to the read-out operation.

In the present invention, there may be previously inputted information on the location of each resolved row and the width of band to preset read-out conditions and then conducted scanning at a scanning line density such that each band is traversed by at least one scanning line in the read-out operation, so as to shorten read-out time and obtain efficiently necessary information. The digital signals corresponding to the autoradiograph in the invention also include the thus-obtained digital signals.

The obtained digital signals $D_{xy}$ comprise a coordinate (x, y) which is represented by a coordinate system fixed to the radiographic film or the stimulable phosphor sheet and a signal level (z) at the coordinate. The signal level represents the density of image at the coordinate, that is, the amount of the radioactively labeled substances. Accordingly, a series of the digital signals (namely, digital image data) have information on two-dimensional location of the labeled substances.

The digital signals corresponding to the autoradiograph of the radioactively labeled substances resolved on a support medium, is subjected to signal processing to determine the base sequence of nucleic acid according to the invention described in more detail below.

Now, the signal processing method of the present invention will be described by referring to an example of an electrophoretic pattern formed with a combination of the following four groups of base-specific DNA fragments labeled with a radioactive element:

(1) guanine (G)-specific DNA fragments,
(2) adenine (A)-specific DNA fragments,
(3) thymine (T)-specific DNA fragments,
(4) cytosine (C)-specific DNA fragments.

Each group of said base-specific DNA fragments is composed of base-specific cleavage products or synthetic products which have various lengths and the same base at terminals.

FIG. 1 shows an autoradiograph of an electrophoretic pattern in which the above four groups (1) to (4) of the base-specific DNA fragments are electrophoresed into the first to fourth slots, respectively.

Digital signals corresponding to the autoradiograph are temporarily stored in a memory device of the signal processing circuit (that is, a nonvolatile memory unit such as a buffer memory, a magnetic disk, etc.).

In the first place, there is prepared a one-dimensional waveform composed of position along the electrophoretic direction and signal level for each electrophoretic row (lane).

Figure 2:
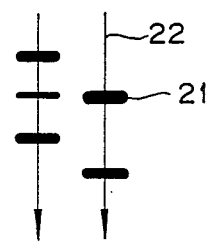
FIG. 2 partially shows the second and third lanes in which a ghost band appears.

FIG. 2 shows the partially enlarged view of the second and third lanes of the electrophoretic pattern shown in FIG. 1.

Figure 3:
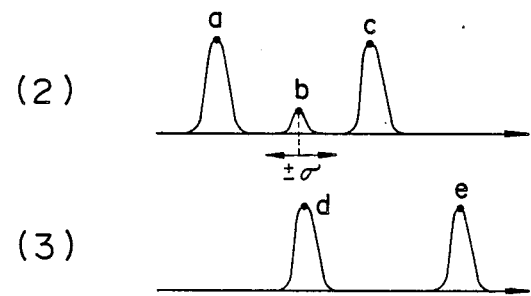
FIG. 3 partially shows one-dimensional waveforms for the second and third lanes shown in FIG. 2.

FIG. 3 shows the partial view of one-dimensional waveforms for these two lanes. The waveforms represent a sectional image obtained by cutting each band along the electrophoretic direction.

The one-dimensional waveform is a graph with position in the electrophoretic direction as abscissa and signal level as ordinate as shown in FIG. 3. When the detection of digital signals is done by conducting scanning along the electrophoretic direction at such a scanning line density that each band is traversed by at least one scanning line (see: FIG. 2, wherein 21 is an electrophoretic band and 22 is a scanning line), the one-dimensional waveform composed of position (y) and signal level (z) can be directly prepared for every scanning line. When the autoradiograph is read out all over the surface thereof, the similar scanning is conducted on the digital image data to extract signals along each lane and the one-dimensional waveform is prepared for each lane.

In the second place, a position (peak position) where signal level is maximum is detected on one of the one-dimensional waveforms. A search for whether there exists a position where signal level is maximum is made within a given region centering the corresponding position to said maximum position on each of the remaining one-dimensional waveforms.

For instance, a peak position ($y_b$) of band b is detected on the one-dimensional waveform of the second lane in FIG. 3. The peak position can be detected by finding out a point where a sign of difference in signal level is inverted. Given regions ($y_b \pm \sigma$) centering the peak position on the one-dimensional waveforms of the remaining first, third and fourth lanes are searched for a position(s) where signal level is maximum.

The search is made within a given range of $\pm \sigma$, because a peak of signal level is not always detected at the same position on a different lane even when a ghost band appears owing to the false inclusion of other base-specific DNA fragments and on the other hand, no peak of another intrinsic band has not to be detected within the given range. $\sigma$ may be previously set to a given value, or may be a variable determined depending upon the peak position, the signal level thereof, etc. Generally, spaces between bands becomes denser toward the electrophoresis-starting position and there is correlation between the band position and the bands' space, so that $\sigma$ may be defined as a function of the peak position $y_b$ [for instance, $\sigma_y = f(y)$] and it can be so set that $\sigma$ becomes smaller toward the electrophoresis-starting position.

When a peak position (band d) is found out within the given region ($y_b \pm \sigma$) only on the third lane as shown in FIG. 3, the signal level of the band b is compared with that of the band d. A ghost band(s) appearing owing to the false mixing of the sample is generally allowed to say that the amount of sample in said band is relatively small and hence, signal level of the ghost band is low. Accordingly, a band in which the signal level is higher is allowed to be left as an intrinsic band and other band(s) is excluded as a ghost band.

Figure 4:
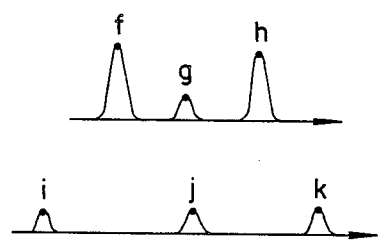
FIG. 4 partially shows an example of other one-dimensional waveforms.

The comparison of the signal levels of bands with each other may be made by simply comparing the height of signal levels (absolute values) at the peak positions thereof, or by calculating relative values of the peak height and comparing them. For instance, the height of signal levels of a ghost band and an intrinsic band may happen to be approximately equal or reversed as shown in FIG. 4 (bands g and j), when there is a considerable difference in the amount of the sample introduced into the slots or when there is a difference in the content of the radioactive element between the four groups of DNA fragments. In this case, it is desirable to calculate the mean value of signal levels for every lane and the ratio of the peak height to the mean level (e.g. to normalize it with the mean level) and then to compare the normalized signal levels with each other. The mean level may be an average of peak height of all bands appearing on the one-dimensional waveform of a lane, or an average of integral values of signal levels (the sectional areas of bands) within a given region centering the peak position of bands.

In FIG. 4, it can be readily decided that the band g is an intrinsic band and the band j is a ghost band by comparing the normalized signal levels with each other.

By the comparison of the signal levels, it is determined that the band b on the second lane is a ghost band and the band d on the third lane is an intrinsic band in FIG. 3.

In the third place, the detection of a peak position is again conducted on the one-dimensional waveform of the second lane.

For instance, there is detected a band a (at a peak position $y_a$) subsequent to the band b. In the same manner as described above, the search for whether a peak position(s) exists or not is made within a given region ($y_a \pm \sigma$) on the one-dimensional waveform of each of the remaining lanes. When no peak position is found out on any other lane, the band a is determined to be an intrinsic band, the position thereof being the peak position $y_a$.

In this way, the positions of all bands appearing on the one-dimensional waveform of the second lane are determined and it is decided whether they are intrinsic bands or not. The bands which are decided to be ghost bands are excluded. This operation is made on other lanes and all bands on the electrophoretic pattern are decided. The decision of the bands may be made lane by lane as described above. Alternatively, the peak positions of the bands may be detected in order of from the longer migration distance to the shorter one, simultaneously on the first to fourth lanes. In this case, the decision of the bands and the sequencing of the bands can be made at the same time.

The digital signals may be previously subjected to threshold processing before the above-described operation, and thereby ghost bands having relatively low signal levels can be excluded.

Thus, the intrinsic band can be distinguished from the ghost band(s) with high accuracy, even when the ghost band appears on the electrophoretic pattern as noise by the false inclusion of the sample or the like.

When the electrophoretic pattern causes various distortion such as a smiling phenomenon, offset distortion or the combining of some bands, or various noises, signal processing for the correction of these distortion or noises may be conducted before the correction of the ghost bands is made.

The smiling phenomenon is a phenomenon in which migration distance of the radioactively labeled substances at the both sides of the support medium are shorter than that in the vicinity of the center thereof.

The smiling phenomenon is caused by heat dissipation effect (so-called edge effect), etc. during the electrophoresis. The offset distortion is a phenomenon in which positions of the lanes are wholly deviated from one another, and is caused by difference between the slots in the electrophoresis-starting position or time of a sample due to a difference in shape between the slots. The combining of bands is a phenomenon in which two or three bands are combined together to form one broad band and is caused by the insufficient electrophoresis. The combined band is generally liable to appear in a region near the electrophoresis-starting position, that is, in the upper region of the pattern.

The signal processing methods for the correction of these distortion and noises are described in more detail in U.S. Pat. No. 4,720,786 and U.S. patent application Ser. Nos. 06/849,187, 06/866,355 (allowed) and 07/030,062 (allowed).

The obtained bands (intrinsic bands) are immediately sequenced by comparing the positions of the bands with one another. The sequence of the bands are readily determined by utilizing the fact that there is no possibility that two or more bands exist at the same positions on different lanes, since the sample is the exclusive combination of the four groups of base-specific DNA fragments. As the slots (1) to (4) have information on the terminal bases of (G), (A), (T) and (C), respectively, the base sequence of DNA can be obtained by substituting the bands with bases corresponding to the slots to which individual bands belong. For instance, the following base sequence of DNA can be obtained.

A-G-C-T-A-A-G-...

Thus, the base sequence of one chain molecule of DNA can be determined. The representation mode of the information on the base sequence of DNA is by no means limited to the above-mentioned mode, and other representation modes may be utilized. For instance, the intensity (z') of each band can be represented as the relative amount of the radioactively labeled substances, if desired. Further, the base sequence of both two chain molecules of DNA can be also represented.

Information on the base sequence of DNA can be also displayed as an image on the basis of the signal processed digital signals. The positions of the detected bands are displayed together with the original autoradiographic image. In this case, investigators themselves can finally determine the base sequence on the basis of the display image.

In the above-mentioned example, there has been described the case where the exclusive combination of (G, A, T, C) of the base-specific DNA fragments is used as a sample, but the signal processing method of the present invention is by no means limited to this combination and is also applied to the combination of (G, A, U, C) of base-specific RNA fragments.

It is possible to perform the genetic philological information processing such as comparison between the obtained base sequence of the DNA and the base sequence of another DNA which has been already recorded and stored in a suitable means.

The information on the base sequence of DNA determined through the above-described signal processing is output from the signal processing circuit and subsequently transmitted to a recording device directly or optionally via storage in a storing means such as a magnetic disk or a magnetic tape.

Various recording devices based on various systems can be employed for the above-described purpose, for instance, a device for visualizing optically by scanning a photosensitive material with a laser beam, etc., a display means for visualizing electrically on CRT, etc., a means for printing a radiation image displayed on CRT by means of a video printer, and a means for visualizing on a heatsensitive recording material using thermic rays.

I claim:

1. A signal processing method for determining base sequence of DNA by subjecting digital signals to signal processing, said digital signal corresponding to an autoradiograph of four resolved rows which are formed by resolving each of the following four groups of base-specific DNA fragments labeled with a radioactive element in one-dimensional direction on a support medium,
    (1) guanine-specific DNA fragments;
    (2) adenine-specific DNA fragments;
    (3) thymine-specific DNA fragments; and
    (4) cytosine-specific DNA fragments;
which comprises steps of:
    (i) preparing a one-dimensional waveform composed of signal position along the resolving direction and signal level for each resolved row;
    (ii) detecting a position where signal level is maximum on the one-dimensional waveform of a resolved row;
    (iii) making a search for whether a position where signal level is maximum exists within a given region including the corresponding position to said maximum position on the one-dimensional waveform for each of other resolved rows;
    (iv-a) when the maximum position exists on the one-dimensional waveform for any of said other rows in the step (iii), comparing the signal level at said maximum position with the signal level at the maximum position detected in the step (ii) and making such determination that a band exists at the maximum position having the higher level and no band exists at the other maximum position;
    (iv-b) when the maximum position does not exist on the one-dimensional waveforms of said other rows in the step (iii), making such determination that a band exists at the maximum position detected in the step (ii);
    (v) detecting again a position where signal level is maximum on the one-dimensional waveform of a resolved row; and
    (vi) repeating in order the steps (iii) through (v) to thereby determine the positions of bands on all the resolved rows.

2. The signal processing method as claimed in claim 1, wherein said a given region including the corresponding position is set depending upon a position where the signal level is maximum exists within said a given region in the step (iii).

3. The signal processing method as claimed in claim 1, wherein said signal levels at the maximum positions are compared on the basis of the height thereof in the step (iv-a).

4. The signal processing method as claimed in claim 1, wherein said digital signals corresponding to the autoradiograph are obtained by placing the support medium and a stimulable phosphor sheet comprising a stimulable phosphor together in layers to record the autoradiograph of the resolved rows on the phosphor sheet as an energy-stored image, irradiating said phosphor sheet with stimulating rays and photoelectrically detecting the autoradiograph as stimulated emission.

5. The signal processing method as claimed in claim 1, wherein said digital signals corresponding to the autoradiograph are obtained by placing the support medium and a radiosensitive material together in layers to record the autoradiograph of the resolved rows on the radiosensitive material as a visible image and photoelectrically reading out the autoradiograph visualized on said radiosensitive material.

6. A signal processing method for determining base sequence of RNA by subjecting digital signals to signal processing, said digital signal corresponding to an autoradiograph of four resolved rows which are formed by resolving each of the following four groups of base-specific RNA fragments labeled with a radioactive element in one-dimensional direction on a support medium,
  (1) guanine-specific RNA fragments;
  (2) adenine-specific RNA fragments;
  (3) uracil-specific RNA fragments; and
  (4) cytosine-specific RNA fragments;
which comprises steps of:
  (i) preparing a one-dimensional waveform composed of signal position along the resolving direction and signal level for each resolved row;
  (ii) detecting a position where signal level is maximum on the one-dimensional waveform of a resolved row;
  (iii) making a search for whether a position where signal level is maximum exists within a given region including the corresponding position to said maximum position on the one-dimensional waveform for each of other resolved rows;
  (iv-a) when the maximum position exists on the one-dimensional waveform for any of said other rows in the step (iii), comparing the signal level at said maximum position with the signal level at the maximum position detected in the step (ii) and making such determination that a band exists at the maximum position having the higher level and no band exists at the other maximum position;
  (iv-b) when the maximum position does not exist on the one-dimensional waveforms of said other rows in the step (iii), making such determination that a band exists at the maximum position detected in the step (ii);
  (v) detecting again a position where signal level is maximum on the one-dimensional waveform of a resolved row; and
  (vi) repeating in order the steps (iii) through (v) to thereby determined the positions of bands on all the resolved rows.

7. The signal processing method as claimed in claim 6, wherein said a given region including the corresponding position is set depending upon a position where the signal level is maximum exists within said a given region in the step (iii).

8. The signal processing method as claimed in claim 6, wherein said signal levels at the maximum positions are compared on the basis of the height thereof in the step (iv-a).

9. The signal processing method as claimed in claim 6, wherein said digital signals corresponding to the autoradiograph are obtained by placing the support medium and a stimulable phosphor sheet comprising a stimulable phosphor together in layers to record the autoradiograph of the resolved rows on the phosphor sheet as an energy-stored image, irradiating said phosphor sheet with stimulating rays and photoelectrically detecting the autoradiograph as stimulated emission.

10. The signal processing method as claimed in claim 6, wherein said digital signals corresponding to the autoradiograph are obtained by placing the support medium and a radiosensitive material together in layers to record the autoradiograph of the resolved rows on the radiosensitive material as a visible image and photoelectrically reading out the autoradiograph visualized on said radiosensitive material.

* * * * *